United States Patent

Benedetti et al.

[11] Patent Number: 6,163,561
[45] Date of Patent: Dec. 19, 2000

[54] COOLED BASKET FOR STEEL PLANTS

[75] Inventors: Giampietro Benedetti, Campoformido; Milorad Pavlicevic, Udine; Alfredo Poloni, Fogliano di Redipuglia; Gianni Gensini, Buia; Angelico Della Negra, Povoletto, all of Italy

[73] Assignee: Danieli & C. Officine Meccaniche SpA, Italy

[21] Appl. No.: 09/381,914

[22] PCT Filed: Mar. 23, 1998

[86] PCT No.: PCT/IB98/00427

§ 371 Date: Sep. 27, 1999

§ 102(e) Date: Sep. 27, 1999

[87] PCT Pub. No.: WO98/42880

PCT Pub. Date: Oct. 1, 1998

[30] Foreign Application Priority Data

Mar. 26, 1997 [IT] Italy ................................ GO97A0007
Sep. 10, 1997 [IT] Italy ................................ GO97A0019

[51] Int. Cl.[7] .................................................. F27D 1/00
[52] U.S. Cl. .............................. 373/72; 373/79; 373/80; 373/9
[58] Field of Search .............................. 266/249; 373/71, 373/72, 75, 76, 79, 80, 83, 2, 8, 9

[56] References Cited

U.S. PATENT DOCUMENTS

| | | |
|---|---|---|
| 3,336,020 | 8/1967 | Palsak . |
| 3,385,584 | 5/1968 | Kemmetmueller ........................ 373/78 |
| 3,880,648 | 4/1975 | Forrest . |
| 4,160,117 | 7/1979 | Schempp .................... 373/79 |
| 4,506,370 | 3/1985 | Yoshimatsu . |
| 4,690,638 | 9/1987 | Nakagawa et al. . |
| 4,736,383 | 4/1988 | Meierling .................. 373/78 |
| 5,106,063 | 4/1992 | Granstrom . |
| 5,153,894 | 10/1992 | Ehle et al. ................................ 373/80 |
| 5,390,212 | 2/1995 | Bonnet et al. ........................... 373/79 |
| 5,416,792 | 5/1995 | Vice ........................................ 373/80 |

FOREIGN PATENT DOCUMENTS

| | | |
|---|---|---|
| 592723 | 4/1994 | European Pat. Off. . |
| 1209507 | 10/1970 | United Kingdom . |
| 9632616 | 10/1996 | WIPO . |

OTHER PUBLICATIONS

Simulationsmodell zur Berechnung der Schrott–vorwarmung mit gestufter Nachverbrennung, Liuyi Zhang Und Franz Oeters: vol. 115, No. 5 May 15, 1995, pp 75–82.

*Primary Examiner*—Tu Ba Hoang
*Attorney, Agent, or Firm*—Antonelli, Terry, Stout & Kraus, LLP

[57] ABSTRACT

Basket to manipulate scrap in cooperation with an arc furnace (11) and with means to pre-heat the scrap by means of the fumes from the fourth hole (14), the basket being able to be associated with a movable covering system (16) and including a containing body, a bottom equipped with toothed lower closing means which may be momentarily opened, and lateral extensions for moving and positioning the basket, the containing body comprising a first upper part (10a) which acts as a buffer store to temporally increase the capacity of the basket (10) and a second lower part (10b) to contain the scrap, with a capacity substantially mating with the volume of the load of the melting furnace (110) which it has to feed, wherein the second lower part (10b) is associated with cooling means.

28 Claims, 8 Drawing Sheets

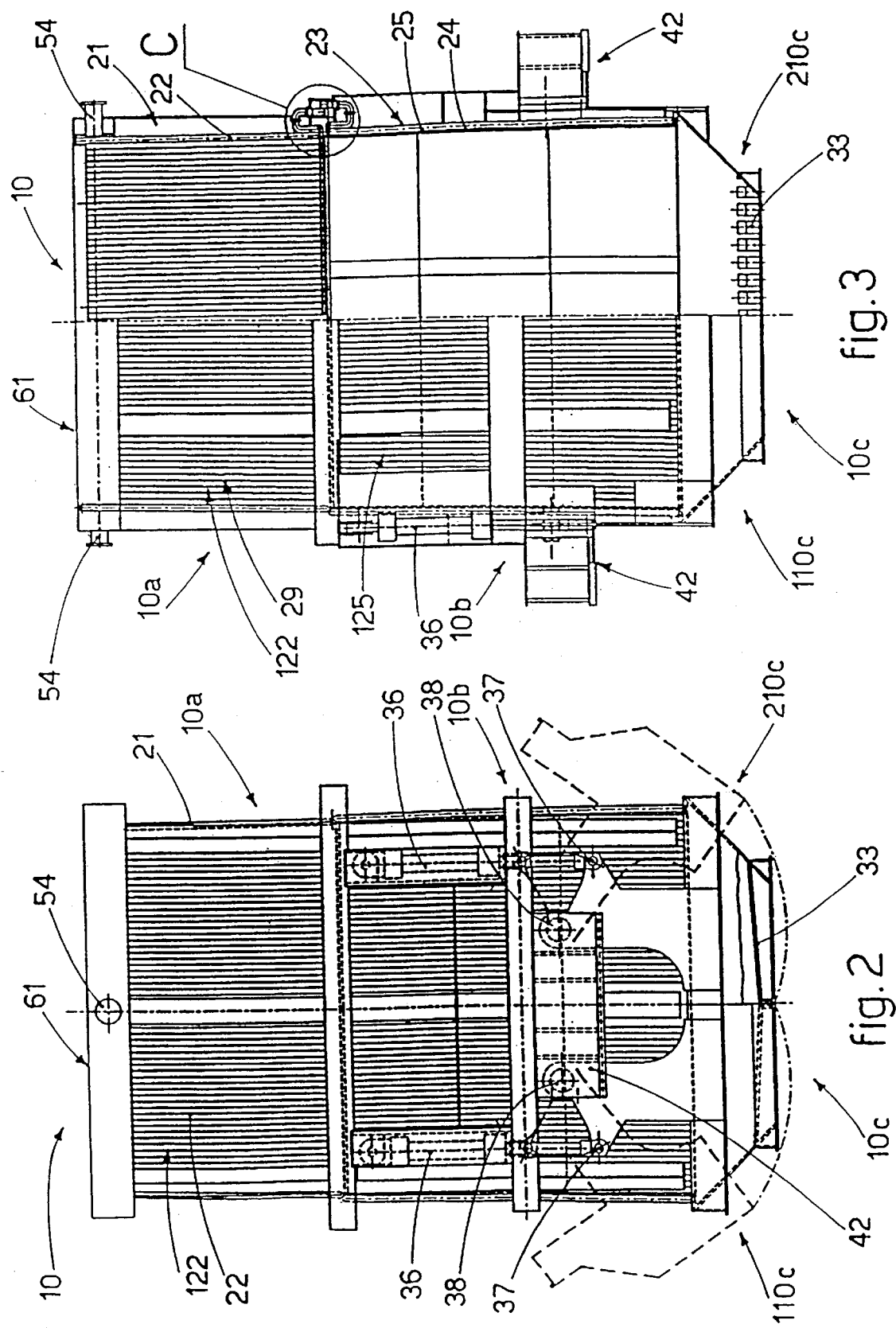

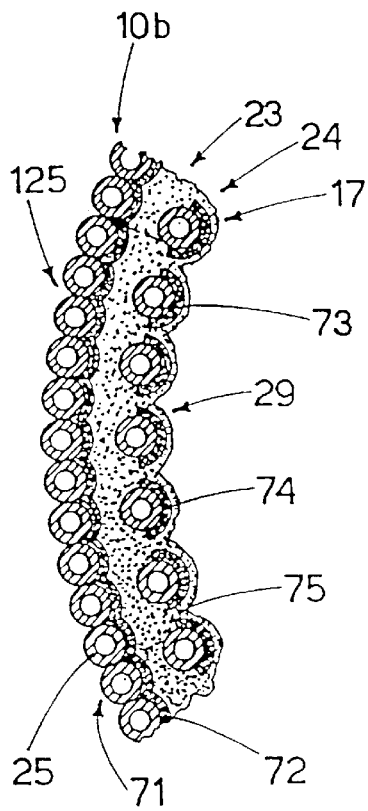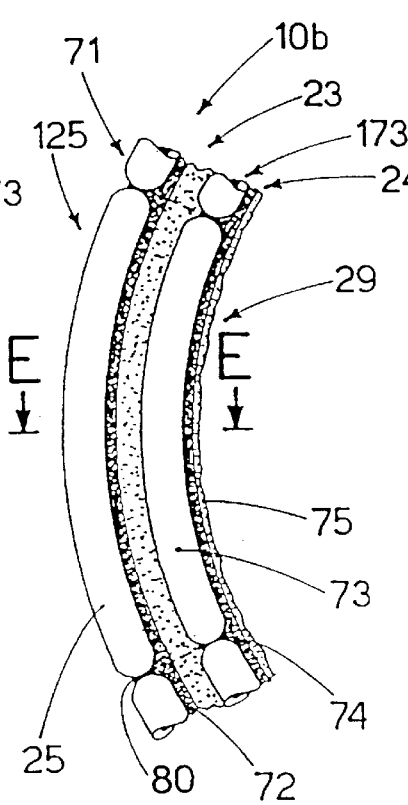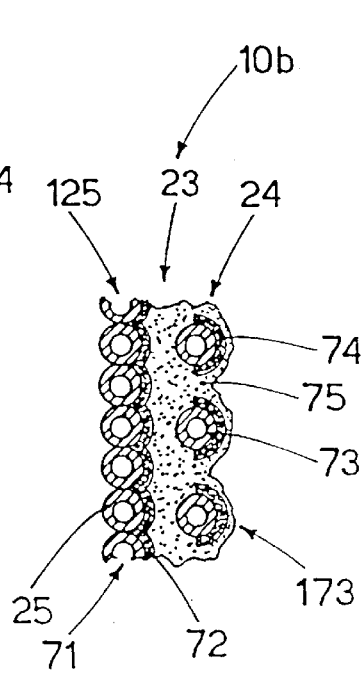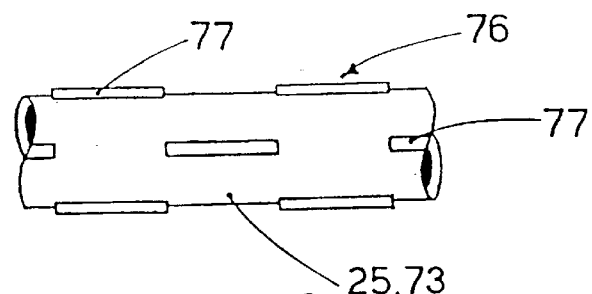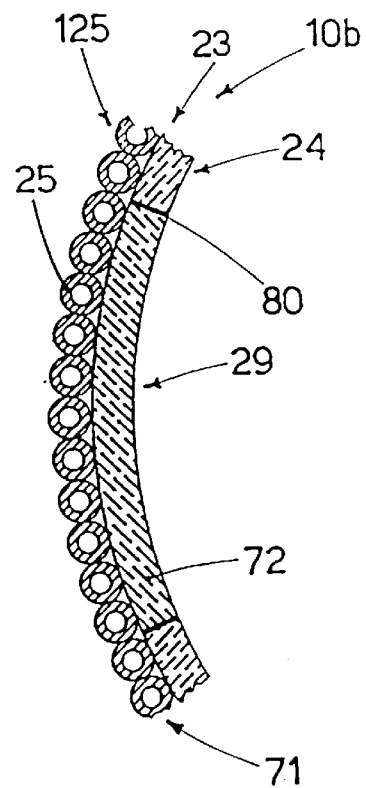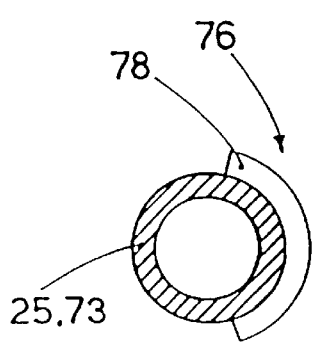

COOLED BASKET FOR STEEL PLANTS

FIELD OF APPLICATION

This invention concerns a cooled basket for steel plants.

The cooled basket according to the invention is used to load and subsequently unload scrap in cooperation with electric furnaces or other plants for melting metals.

The cooled basket according to the invention is suitable to cooperate with plants for the pre-heating of scrap which employ the exhaust fumes generated by the furnace and, advantageously, with systems which automatically manage the operations of pre-heating, positioning, unloading into the furnace and repositioning.

STATE OF THE ART

In melting plants in steel works which use systems to load the furnace of a discontinuous type, the state of the art covers the use of containers, known as baskets, which are filled with scrap to be sent for melting, emptied inside the furnace and then taken back to the area where the scrap is loaded.

Such baskets include at the lower part means which can be momentarily opened such as blades, teeth, valves or similar, which open when the basket is placed in correspondence with the mouth of the furnace to let the scrap contained inside come out.

It is also well-known in the state of the art that, in order to reduce melting times and to improve the efficiency of the first steps of the cycle inside the furnace, the scrap in the basket, before being unloaded, is subjected to pre-heating by using the fumes leaving the furnace.

These fumes are usually conveyed into the appropriate rooms where the baskets are to be found; the latter are gradually removed full of hot scrap and then returned full of cold scrap.

The use of tower-type containers is also known; they are placed on movable trolleys near the melting furnace and can be moved from a pre-heating position to a position wherein the hot scrap is unloaded into the furnace.

These containers are loaded either by conveyor belts which are costly and also take up considerable space, or by baskets manipulated by bridge cranes which unload the scrap from above the container itself.

If the container is loaded from above, very high sheds are required, which are not usual, and these require heavy and costly structures which are made for the purpose.

The pre-heating procedure brings a plurality of advantages because the furnace is thus fed with scrap already at the correct temperature.

However, when pre-heating is carried out in the basket, it also brings some disadvantages caused by the excessive and dangerous over-heating of the walls and the bottom of the basket.

Given the high temperatures of the fumes which come to surround the basket, and possibly are made to circulate inside thereof, there are considerable increases in temperature even in the containing structure, which involves operational problems in the manipulation and movement of the basket.

Moreover, together with the fumes, also powders, slag and other dirt is conveyed inside the basket, and, as these pass through the scrap they can cause the pieces of scrap to stick together, and therefore difficulties in unloading the scrap from the basket into the furnace.

When the scrap is unloaded into the furnace, it falls violently and causes immense blasts of heat to escape from the furnace itself; these hit the basket and cause further, unwanted damage.

Moreover, during unloading abundant amounts of powders, particles and other pollutant substances escape from the furnace and contaminate the area around the mouth of the furnace.

A further problem with baskets for scrap as are known to the state of the art concerns the manipulation and the manipulation times which lengthen the times of the tap-to-tap cycle.

Yet another problem is the low efficiency of the transfer of heat energy from the fumes to the scrap.

The applicant does not know of any baskets for scrap used for loading melting systems which are able to obviate all the above-mentioned disadvantages.

The state of the art includes U.S. Pat. No. 5,106,063 which describes a cooled container for scrap to be unloaded into a melting furnace.

This container comprises substantially an inner casing structure, cylindrical in shape and made of metal, supported by an outer bearing structure consisting of a plurality of tubular elements, arranged on the circumference and reciprocally separated, inside which the cooling fluid flows.

The bottom of the container consists of two half-portions which can be opened to unload the scrap inside the furnace; these too are equipped with a cooling system with circulating fluid.

Although this solution gives quite an efficient cooling of the scrap container and a satisfactory pre-heating cycle under normal operating conditions, it may not be quite so efficient in particular circumstances, and may give rise to various disadvantages during maintenance operations and/or the replacement of components.

In fact this cooling system comprises a single circuit for the circulation of the cooling fluid, and therefore it is impossible to cool the different component parts of the container (walls and bottom) in a differentiated manner when this is necessary and/or advantageous due to the different temperatures in force.

What is more, under certain operating conditions the separated arrangement of the tubular elements inside which the cooling fluid circulates may cause a cooling effect on the container which is not uniform, and consequently damage the said container.

Furthermore, the continuity of the inner casing structure of the container substantially restricts the thermal expansion thereof, and this may become a problem in view of the fact that this structure is continually exposed to extremely high temperatures.

This continuity also makes the operations to maintain or restore the container more complex and difficult, since it is necessary to intervene on the whole structure of the casing.

Moreover, in the event that the scrap introduced into the basket becomes entangled, or should take up an undesired position which might create empty spaces inside the basket, it becomes impossible to load the basket with the desired quantity of scrap.

The container proposed by U.S. Pat. No. 5,106,063 moreover once again includes the aforementioned shortcomings concerning the pollution of the environment when the scrap is unloaded into the furnace, the optimisation of the manipulation times and the tap-to-tap cycle, and the exploitation of the thermal potential of the fumes used for pre-heating.

The present applicant has therefore designed, tested and embodied this invention to overcome the shortcomings of the state of the art and to achieve further advantages.

DISCLOSURE OF THE INVENTION

The purpose of the invention is to provide a basket to be used in operations to load/unload scrap, in cooperation with an electric furnace in steel plants, which will allow the scrap to be heated directly by the fumes leaving the fourth hole of the furnace and at the same time to optimise all the operations so as to reduce to a technological minimum the tap-to-tap time.

One of the purposes of the invention is also to provide a basket equipped with a cooling system which is differentiated in its various structural parts, which will eliminate overheating even in correspondence with the means on the bottom of the basket which can be momentarily opened.

A further purpose of the invention is to obtain a system which can limit the environmental contamination caused by the leakage of powders, incandescent particles and other pollutants in the area around the furnace, during the unloading step, and in the area around the basket itself during the pre-heating steps.

Another purpose is to limit to a minimum the escape of fumes and heat into the environment surrounding the furnace during the steps of unloading the scrap and to exploit to a maximum the heat energy of the pre-heating fumes.

A further purpose is to simplify the manipulation of the basket so as to obtain an organic operating cycle substantially without any useless down times, at the same time without using the usual bridge crane means except for the time when it is strictly necessary, and when they are free from other activities.

The invention also has the purpose of creating a coordinated structure consisting of the basket and movable means to move the basket towards and away from the furnace; this structure comprises automatic systems for reciprocal connections and automated phases which condition all the operations.

Yet another purpose of the invention is to avoid the necessity of raising to excessively high levels the runways of the bridge cranes which have to manipulate the baskets, as happens in the case of stationary pre-heating containers.

A further purpose of the invention is to guarantee an efficient descent of the scrap inside the furnace during the unloading step, ensuring the best possible seal to prevent possible leaks and seepages into the environment both of heat and of powders or other pollutants.

It is also a purpose of the invention to exploit as much calorific power as possible of the fumes which pass through the basket during the pre-heating step.

Another purpose of the invention is to reduce the times of the operations to maintain and/or restore the structure of the basket, at the same time simplifying those operations.

The cooled basket according to the invention consists substantially of a container open at the upper part and which can be associated with a mating covering system, of a transverse section normally cylindrical or similar thereto.

According to a variant, the basket has a flared shape towards the bottom so as to assist the scrap to come out during the unloading step.

The cooled basket has an upper part which substantially functions as a storage and safety area, a lower part which defines the area containing the scrap and a bottom equipped with containing means which can be momentarily opened.

The function of the upper storage and safety area is to temporally increase the capacity of the basket during the loading step, in the event that, during this step, the scrap becomes tangled or is arranged incorrectly and therefore is not able to occupy all the available space in the underlying area which is intended for the scrap, or in the event that the scrap has a lower apparent density.

The underlying space is intended to contain the correct quantity of scrap to be unloaded into the furnace for each cycle, and the volume of the lower part substantially defines the capacity of the basket.

According to the invention, the upper part, or safety part, includes a wall consisting of a bundle of adjacent pipes wherein the cooling fluid, normally water, circulates.

According to a first embodiment, the adjacent pipes have a vertical development and are part of the structure of the basket.

According to a variant, the adjacent pipes are arranged on a horizontal plane.

The lower part of the basket defining the area containing the scrap has a first inner wall and associated with it there is a second outer wall consisting of adjacent pipes wherein the cooling fluid circulates.

In a first embodiment, the adjacent pipes have a vertical development.

According to a variant, the adjacent pipes develop horizontally.

In a preferential embodiment of the invention, the upper part and the lower part are achieved as modular panels which can be individually attached/detached.

This panel arrangement of the basket allows quicker and easier maintenance and/or restoration operations, since it is possible to intervene on the individual panels rather than on the whole structure, and possibly replace one part thereof in the event of wear or malfunction of the cooling system.

According to another variant, the panels cooperate with connection and sliding means which prevent damage in the event of thermal expansion.

According to a variant, the first inner wall and the second outer wall of the lower part are separated by filling material with the appropriate coefficient of heat conductivity.

In one embodiment of the invention the first inner wall consists of a layer of refractory material.

This solution makes it possible to protect the adjacent pipes both from the high temperatures inside the basket, and also from damage caused by the unloading of the scrap. It is thus possible to contain the dispersion of heat energy into the outer environment, thus improving the efficiency of the pre-heating process.

According to a variant, the first inner wall comprises a circuit of pipes inside which cooling fluid circulates; the pipes of this circuit are arranged separated from the adjacent pipes of the second outer wall and their interaxis is greater than that of the outer circuit of pipes.

According to another variant, between the two circuits there is a layer of refractory material.

According to a further variant, the pipes of the first inner wall are lined at the front part by a layer of refractory material.

According to the invention, the separating spaces between the pipes of the first inner wall encourage particles and powders carried by the fumes to be deposited on the cooling pipes of the second outer wall; as they cool, these particles and powders solidify and anchor themselves to the pipes.

This causes a considerable layer to form in a single body, which insulates and protects the pipes from mechanical stresses.

Moreover, the heat accumulated by this monolithic layer during the pre-heating of the scrap is then given up due to irradiation during the subsequent pre-heating cycle, thus increasing efficiency.

According to a variant, at least on the pipes of the first inner wall of pipes there are means to accentuate the formation of the monolithic layer, which encourage the particles and powders to deposit there.

According to a variant, between the two circuits of pipes there is a third circuit; the interaxis of the pipes has an intermediate value with respect to that of the aforesaid two circuits.

In a preferential embodiment, at least the inner circuit of pipes is fed independently, which allows it to be excluded in the event of a breakage or malfunction, while the outer circuit of pipes continues to function.

According to a variant of the invention, the circuits of pipes are connected to each other by means of hook means, in order to obtain a more stable and solid structural whole.

In one embodiment of the invention, the pipes are made of a continuous structure without intermediate welds or joins, which limits the number of critical points in the structure of the basket.

According to another variant, the cross section of the pipes is not circular or composite, in order to make the cooling fluid circulate only in the part of the pipe exposed to the heat flow, which optimises the coefficient of heat exchange of the cooling pipes.

The coefficient of heat exchange is also conditioned, according to a variant, by regulating the speed of feed of the cooling fluid.

In correspondence with the substantially circular bottom, the basket according to the invention includes a plurality of movable toothed containing means arranged radially and connected peripherally to each other by means of an outer ring.

The teeth consist of a box structure inside of which the cooling fluid flows and, according to the invention, the outer ring functions as a collector and feeder for the cooling fluid.

According to a variant of the invention, the cover of the basket also includes a cooling system with circulating cooling fluid.

According to the invention, at least the upper part and the lower part of the basket include circuits of differentiated and autonomous cooling.

According to a preferential embodiment, each component part of the basket includes a relative and independent cooling circuit.

Thanks to the autonomous circuits for the circulation of cooling fluid in the various component parts of the basket, these zones may be cooled in a differentiated manner according to the temperatures to which they are exposed, or according to other necessities connected to the pre-heating cycle, thus avoiding waste and therefore reducing the management costs of the system.

The cooled basket according to the invention includes, advantageously in a position near the base, lateral extensions on which there are positioning and centering holes, or pins, such as to make the basket suitable to be correctly positioned from time to time onto movable moving means in order to constitute a coordinated and functional structure.

With this embodiment it is possible to use the baskets loaded with scrap ready for pre-heating in a position very close to the furnace, without having to modify the structure of the shed and without having to use other containers or structures.

Moreover, the coordinated and functional structure obtained by combining the basket according to the invention with the movable moving means makes it possible to use the basket also to unload the pre-heated scrap directly into the furnace with extremely reduced cycle-times and with minimum heat loss.

In one embodiment of the invention, the positioning of the basket on the movable means causes the automatic coupling of the fluid connections to feed the various fluids from the relative sources to the various pipes or connections on the basket.

According to a first embodiment of the invention, the baskets have in a lower position a fume intake ring which is momentarily connected to the discharge pipe.

According to a variant of the invention, in the preheating position, the cooled basket cooperates with intake means arranged on the plane underneath and connecting momentarily with the bottom of the basket by means of a connection joint which can be moved from an intake position to a non-operative position. The connection joint includes advantageously sealing means.

According to one embodiment of the invention, the movable means to move the basket include an intake ring, connected to the pipe to discharge the fumes, and cooperating with the lower part of the basket and with movable hood elements.

The movable hood elements have a closed position associated with the walls of the basket and an open position which is raised and far from the walls of the basket.

According to a variant, the movable hood elements include packing means which improve the hermetic seal against infiltrations and leakages.

During the unloading of the scrap into the furnace, the hood elements are arranged in a closed position cooperating with the walls of the basket and serve to contain the fumes which come out of the furnace at the top and spread around the bottom of the basket.

The fumes are therefore entirely conveyed inside the intake ring and discharged by means of the discharge pipe, which prevents environmental contamination and heat losses from inside the furnace.

According to a further variant, in cooperation with at least one wall of at least some of the teeth defining the bottom of the basket, there are temperature monitoring means suitable to prevent any possible overheating and to automatically control the steps.

According to another variant, the basket according to the invention is equipped with at last a conduit to deliver oxygen which has the function of generating post-combustion reactions of the fumes inside the basket and around the scrap, at the same time raising the temperature.

According to yet another variant, the covering means and/or the side walls of the basket are equipped with burners to achieve a post-combustion of the fumes conveyed inside the basket during the pre-heating step.

According to the invention, from the moment the basket is loaded with scrap and constitutes a coordinated and functional structure with the movable movement means, to the moment when it is empty and is replaced, the various steps and operations connected with the management of the basket are automated, managed and controlled by computer means.

ILLUSTRATION OF THE DRAWINGS

The attached figures are given as a non-restrictive example and show some preferred embodiments of the invention as follows:

FIG. 1 shows a diagram of a possible application of the cooled basket according to the invention in cooperation with an electric arc furnace;

FIG. 2 shows a lengthwise section of the cooled basket according to the invention from a first viewpoint;

FIG. 3 shows a lengthwise section of the cooled basket according to the invention from a second viewpoint;

FIG. 4 shows a transverse section of the cooled basket according to the invention;

FIG. 5 shows a detail of a transverse section of the side wall of the cooled basket according to the invention;

FIG. 6 shows the detail A of FIG. 4;

FIG. 7 shows the detail B of FIG. 4;

FIG. 8 shows the detail C of FIG. 3;

FIG. 9 shows a section of a detail of the bottom of the cooled basket according to the invention;

FIG. 10 shows a section from E to E of FIG. 9;

FIG. 11 shows in diagram form the cooled basket according to the invention during the unloading of the scrap into the furnace;

FIG. 12 shows in diagram form the detail of the rapid coupling system between the cooled basket and the movable moving means;

FIG. 13 shows in diagram form a variant of FIG. 1;

FIG. 14 shows a variant of FIG. 11;

FIG. 15 shows a section of a variant of the sealing system between the valves and the body of the basket;

FIG. 16 shows the section from D to D of FIG. 15;

FIG. 17 is a part view of a transverse section of the lower part of the cooled basket according to a variant of the invention;

FIG. 18a shows a variant of FIG. 17;

FIG. 18b shows the section from E to E of FIG. 18a;

FIG. 19 shows a variant of FIGS. 17 and 18a;

FIGS. 20 and 21 show possible forms of embodiment of the anchorage elements for the pipes of FIGS. 17 and 18a.

DESCRIPTION OF THE DRAWINGS

The cooled basket 10 according to the invention is shown in FIG. 1 associated with movable moving means including a trolley 12 so as to constitute a coordinated and functional structure 44 cooperating with an electric arc furnace 11.

In this case, the movable trolley 12 is suitable to perform to-and-fro movements mating with the movement of the roof 13 of the furnace 11.

Figure 4:
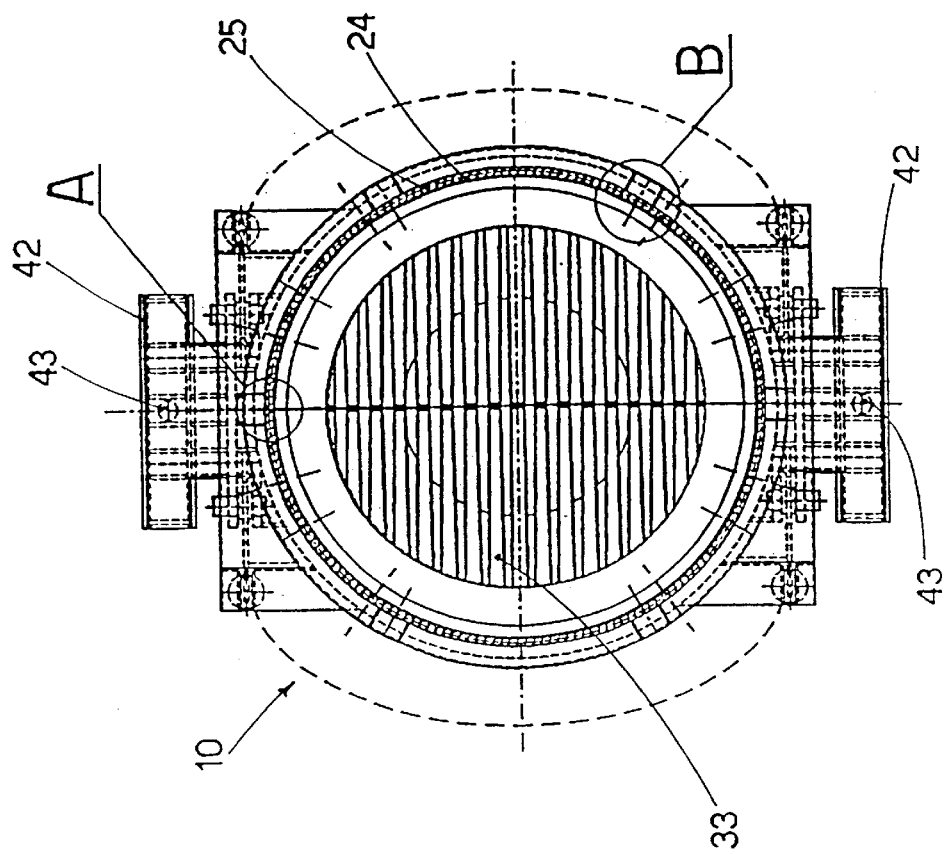

In connection with the fourth hole 14 of the furnace 10 there is a pipe 15 which conveys the fumes leaving the furnace 11 towards the inside of the cooled basket 10 which is loaded with scrap.

In this case, the fumes are conveyed from above through an aperture on the covering system 16 which can be temporally associated with the cooled basket 10.

The covering system 16 cooperates with an opportune supporting and connection base 61 which is present on the upper part of the cooled basket 10 and includes the opportune sealing means.

Figure 1:
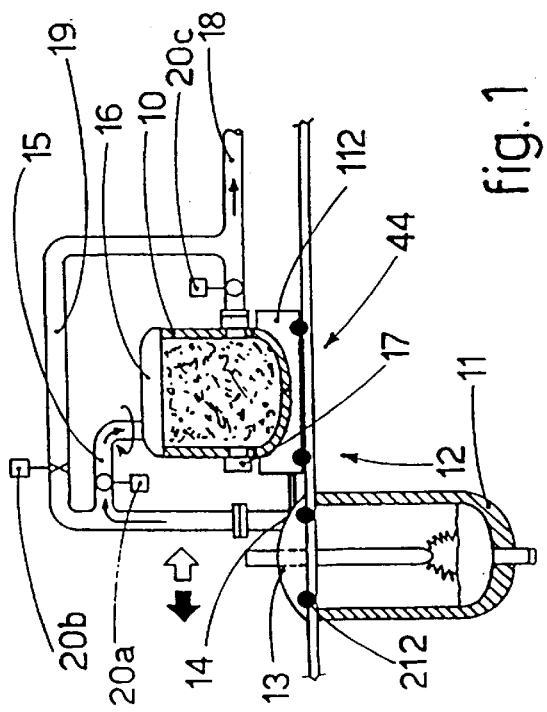
Figure 5:
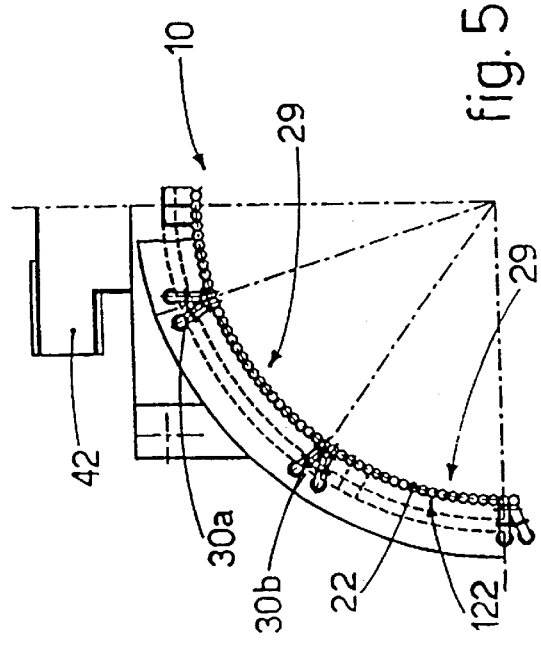
Figure 6:
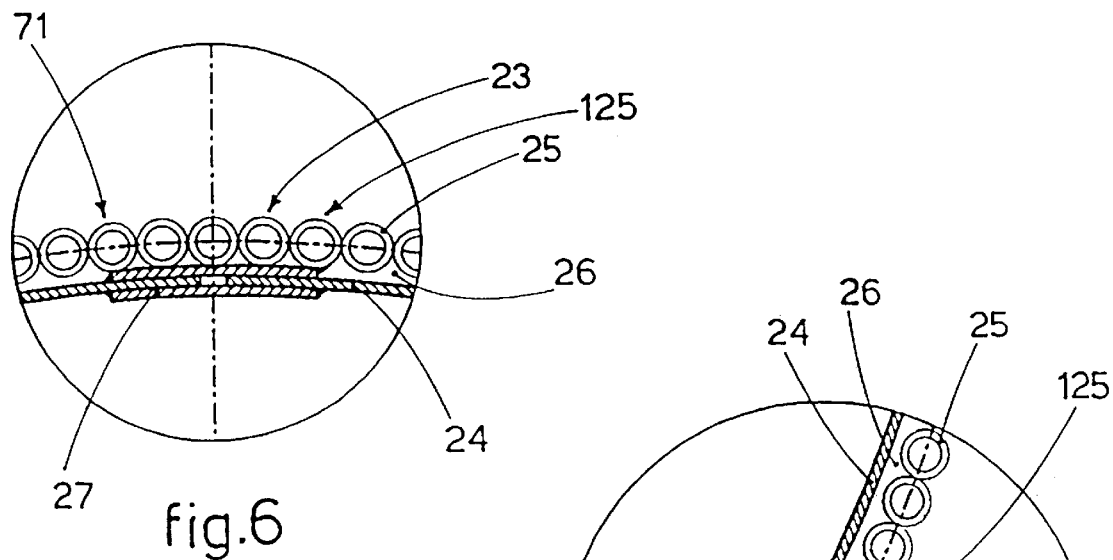
Figure 7:
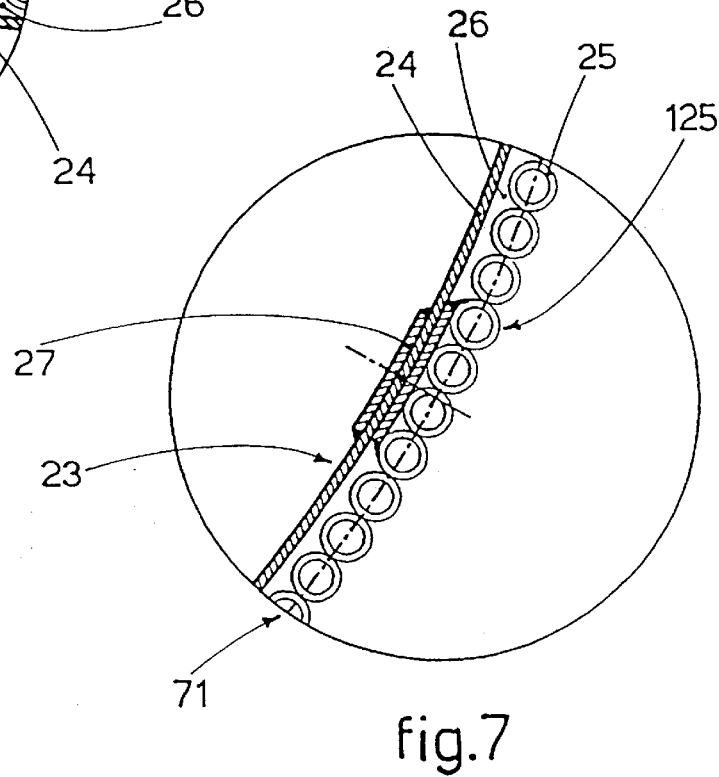

The fumes are taken in and discharged, in the case shown in FIG. 1, by means of a ring 17 placed in cooperation with the lower part of the cooled basket 10, and sent to purification and discharge by means of the discharge pipe 18.

When the cooled basket 10, after having unloaded the preheated scrap, is removed from its position to be replaced by a full basket, the fumes leaving the furnace are conveyed directly from the fourth hole 14 to the discharge pipe 18 by means of the branch 19.

On the pipe 15, the branch 19 and the pipe 18, there are interception means which can be temporally activated, respectively 20a, 20b, and 20c, so as to achieve the desired diversions in the flow of fumes according to the steps of the working cycle of the cooled basket 10 when it is combined with the movable trolley 12 to constitute the coordinated and functional structure 44.

The cooled basket 10 according to the invention is shown in detail with two lengthwise sections in FIGS. 2 and 3.

In the embodiments shown, the cooled basket 10 has a substantially cylindrical shape.

According to a variant which is not shown here, the cooled basket 10 is flared towards the bottom, at an angle of between 1° and 5°, so as to assist the descent of the scrap during the unloading step.

The cooled basket 10 comprises, in this case, a first upper part 10a, a second lower part 10b and a bottom 10c.

The first upper part 10a includes a supporting and connection base 61 so as to be able to cooperate with the covering system 16; moreover, it includes the usual means 54 to move the basket 10, for example by means of a crane.

The function of the first upper part 10a is to contain the scrap in the event that it becomes tangled and arranged incorrectly in such a way that it does not completely occupy the containment area defined by the second lower part 10b.

In this case, the first upper part 10a includes a wall 21 consisting of a bundle 122 of pipes, with the vertical adjacent pipes 22 extremely close together, wherein the cooling fluid flows.

According to a variant which is not shown here, the bundle of pipes 122 has pipes 22 which are arranged horizontally.

The second lower part 10b includes a wall 23 defined by a first inner wall 24 associated on the outer part with a second outer wall 71 consisting of a bundle of pipes 125 of vertical pipes 25, very close together, wherein the cooling fluid flows.

According to a variant shown in FIGS. 18a and 18b, the bundle of pipes 125 which constitutes the outer wall 71 includes pipes 25 arranged on a horizontal plane.

According to another variant, in the interspaces between the inner wall 24 and the outer wall 71 there is filling material 26 with the opportune coefficient of heat conductivity, for example silicon carbide or other suitable material.

In the embodiment shown in FIGS. 6, 7, 15 and 16, the inner wall 24 is composed of a plurality of metallic elements arranged like the arc of a circle, associated with each other by means of connection and sliding plates 27 which permit an at least partial thermal expansion of the wall, preventing any possible deformations or breakages caused by this phenomenon.

The continuous inner wall 24 allows the scrap to descend without meeting any obstacles, and also can be restored or replaced easily in the event of wear.

FIGS. 17, 18a, 18b and 19 show variants of the inner wall 24.

The embodiment shown in FIG. 19 shows an inner wall 24 consisting of a layer of refractory material 72 with great hardness and resistance of the appropriate thickness.

The layer of refractory material 72 constitutes a protective barrier for the bundle of pipes 125 which is thus thermally insulated, as it is not exposed to the high temperatures which develop inside the basket 10.

Moreover, this limits dispersion towards the outer environment of the heat energy developed by the fumes and increases the efficiency of the pre-heating process.

The great hardness of the layer of refractory material 72 also preserves the bundle of pipes 125 from mechanical stresses deriving from the loading/unloading of the scrap.

In the embodiment shown in FIGS. 17, 18*a,* 18*b,* the inner wall 24 also comprises an inner bundle of pipes 173 arranged detached from the bundle of pipes 125 of the outer wall 71.

The pipes 73 of the inner bundle of pipes 173 are distanced from each other according to a desired interaxis and, in this case, are substantially parallel to the pipes 25 of the bundle of pipes 125.

The pipes 73 of the inner bundle of pipes 173 are moreover lined, in their portion which faces the inside of the basket 10, by a layer of refractory material 74 applied by spraying.

During the pre-heating process, the distanced arrangement of the pipes 73 encourages the deposit of particles and powders deriving from the pre-heating fumes on the pipes 73. The particles solidify and amalgamate with each other, and form a monolithic block 75 which incorporates substantially the inner bundle of pipes 173.

The monolithic block 75 acts as a thermally insulating barrier, and preserves the bundle of pipes 125 and 173 from the damaging effects of the high temperatures inside the basket 10 and any possible impacts from the scrap 11.

Moreover, it limits to a minimum the dispersions of heat energy to the outer environment and actually accumulates part of this energy, giving it up in the course of the subsequent pre-heating cycle.

According to a variant shown in FIGS. 20 and 21, the pipes 25 and/or the pipes 73 include anchorage elements 76 on the outer surface facing towards the inside of the basket 10, which are suitable to encourage the deposit and accumulation of particles and powders and therefore the formation of the monolithic block 75.

In FIG. 20, the anchorage elements 76 consist of segmented ridges 77, in this case distributed in a chequered manner; in FIG. 21 the anchorage elements 76 consist of longitudinal ribs 78, in this case arc-shaped.

According to a variant which is not shown here, the inner wall 24 comprises a third bundle of pipes arranged in an intermediate position between the bundles of pipes 125 and 173; the third bundle of pipes consists of cooling pipes which are distanced by an intermediate interaxis between those of the cooling pipes 25 and 73.

The inner bundle of pipes 173 is advantageously fed independently of the outer bundle of pipes 125 and the third bundle of pipes when included. This allows it to be excluded in the event of breakages or malfunctions, and thus it is possible to maintain the cooling effect of the basket 10 by means of the outer bundle of pipes 125 alone.

According to a variant which is not shown here, the pipes 25 and/or 73 and/or the pipes of the possible third bundle of pipes are not circular in cross section; they are for example oval, or of a composite nature so as to limit the passage of the cooling fluid only to the portion of the pipes which faces inside the basket 10.

According to a variant, the circuits of pipes are structurally connected to each other by means of suitable hook elements.

In correspondence with the area of separation between the first upper part 10*a* and the second lower part 10*b* of the cooled basket 10 there is, in this case, an annular conduit 55 equipped with a plurality of nozzles 28 for the introduction of oxygen into the basket 10 and around the scrap, in order to activate post-combustion reactions of the fumes passing through the basket 10 inside the basket 10 itself.

The post-combustion reactions, apart from raising the temperature of the fumes, also make it possible to obtain an efficient purification of the fumes.

Figure 13:
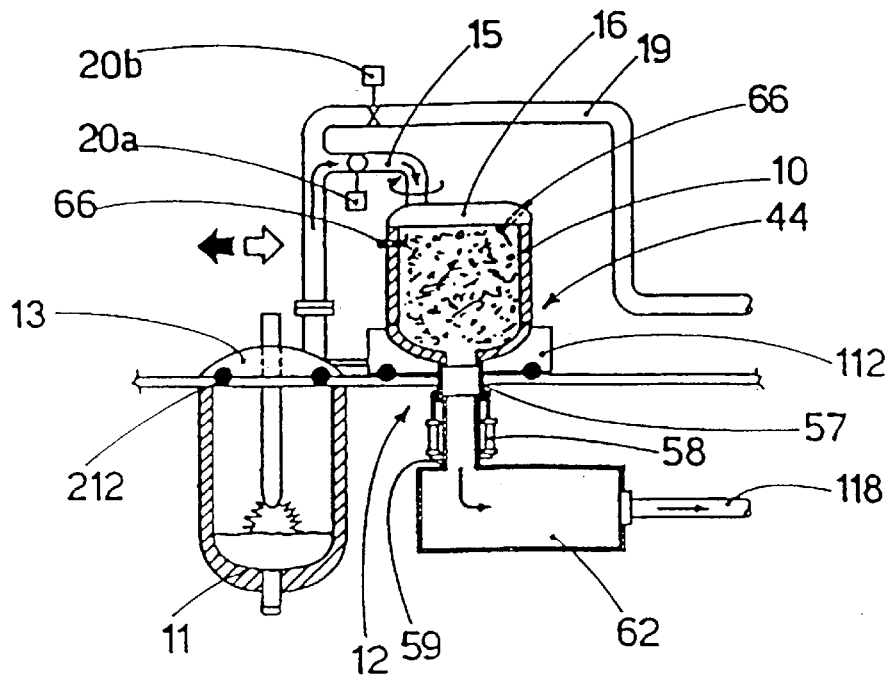

According to a further variant, shown as an example only in FIG. 13, the cooled basket 10 is equipped at its upper part, for example in the space immediately underneath the covering system 16, with a plurality of burners 66.

In this case, the wall 21 of the upper part 10*a* and/or the walls 24, 71 of the second lower part 10*b* of the cooled basket 10 are configured as panels 29, each one covering a defined arc of a circle of the relative peripheral portion of the cooled basket 10. With this solution it is possible to carry out rapid maintenance.

Between the panels 29 there are also thermal expansion joints 80 (FIGS. 18*a,* 19) which, when this phenomenon occurs, prevent breakages or damage of the panels 29.

Each of the panels 29 comprises its own inlet 30*a* and its own outlet 30*b* for the cooling fluid, respectively connected to the relative feeder and discharge units for the cooling fluid.

Figure 8:
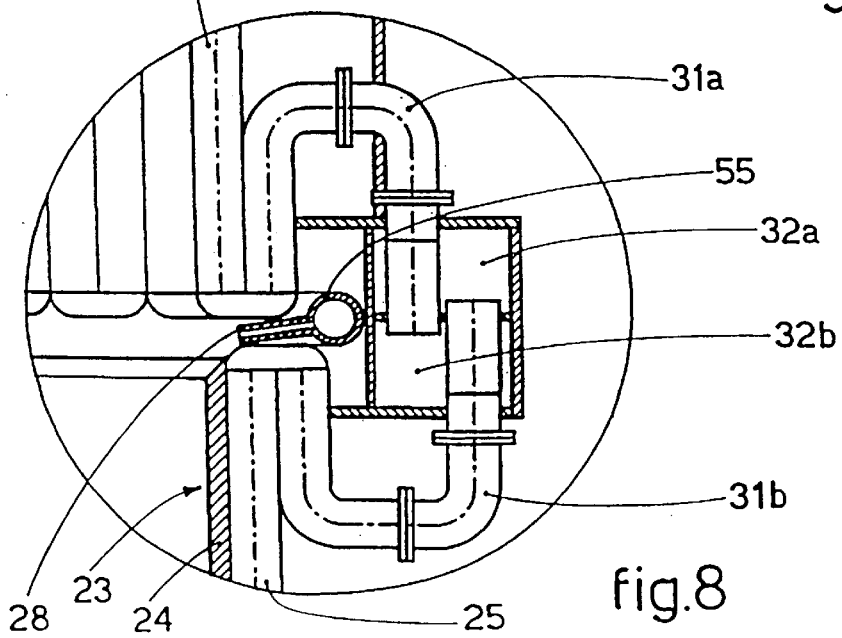

FIG. 8 shows in detail a system to feed/discharge the cooling fluid.

The figure shows the elements 31*a* which connect the pipes 22 of one panel 29 of the first upper part 10*a* and the elements 31*b* which connect the pipes 25 of a panel 29 on the second lower part 10*b* with the relative areas to feed 32*a* and discharge 32*b* the cooling fluid.

According to the invention, at least the upper part 10*a* and the lower part 10*b* include autonomous and differentiated circuits to feed and discharge the cooling fluid.

In a preferential embodiment of the invention, the covering system 16 also includes a cooling circuit with circulating fluid.

According to one embodiment, the covering system 16 is identical in composition to the structure of the second lower part 10*b* of the basket 10, and can be made with an inner wall which consists of a layer of refractory material or, alternatively, with an inner wall comprising an inner bundle of pipes.

The pipes of the bundles of the covering system 16 can be arranged radially or horizontally.

In this case, the bottom 10*c* of the cooled basket 10 consists of means which can be temporally opened comprising a plurality of teeth 33 arranged radially and distanced one from the other.

Each tooth 33 is defined by a box structure inside which the cooling fluid is made to flow along a desired route.

In a preferential embodiment of the invention, the basket 10 includes cooling circuits which are autonomous for each component part thereof (cover 16, upper part 10*a,* lower part 10*b,* bottom 10*c*). In this way, the cooling process may be differentiated according to specific requirements and operational conditions.

In this case, the cooling fluid is fed through a peripheral ring 34 which acts as a distributor for the fluid.

Figure 10:
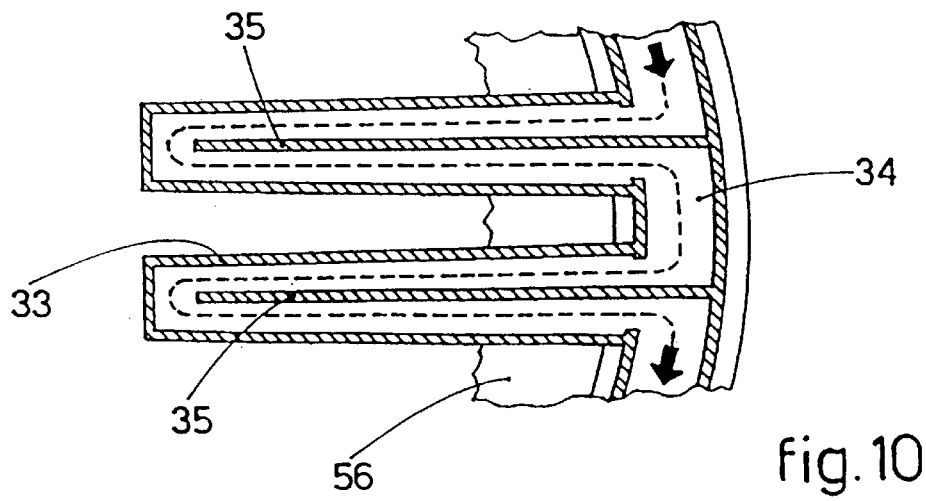

Each tooth 33 includes inside a separating and conveying plate 35, as each tooth 33 is connected with the preceding and following tooth 33 (FIG. 10) through the peripheral ring 34.

Associated with the teeth 33 there is a sealing and stiffening ring 56.

When the loaded cooled basket 10 is associated with the movable trolley 12 so as to constitute the coordinated and functional structure 44 and is in the position to pre-heat the scrap, the sealing and stiffening ring 56 cooperates with a connection ring 57.

The connection ring 57, by means of the opportune movement means 58, can be temporally displaced along the underlying intake pipe 59 so as to create the desired seal for the intake of the fumes.

The bottom 10c of the cooled basket 10 is structured in two portions, respectively 110c and 210c, which can be moved from a first closed position, shown by a continuous line in FIG. 2, to a second, open position, shown by a line of dashes in FIG. 2.

In the second, open position, when the cooled basket 10 is positioned by the movable trolley 12 above the mouth of the furnace 11, the teeth 33 open and unload the scrap contained in the basket 10 into the furnace 11.

The opening and closing of the bottom 10c is obtained, in this case, by activating the appropriate oil-dynamic actuators 36, which are associated with the respective portions 110c and 210c, in correspondence with the respective constraint point 37.

Each portion 110c and 210c rotates around the relative hinge point 38 and opens in order to unload the scrap.

The outer wall 40 of each portion 110c, 210c of the bottom 10c includes sealing means 39 which cooperate, in the relative closed position, with the outer wall 71 of pipes 25 of the lower part 10b of the cooled basket 10.

Figure 15:
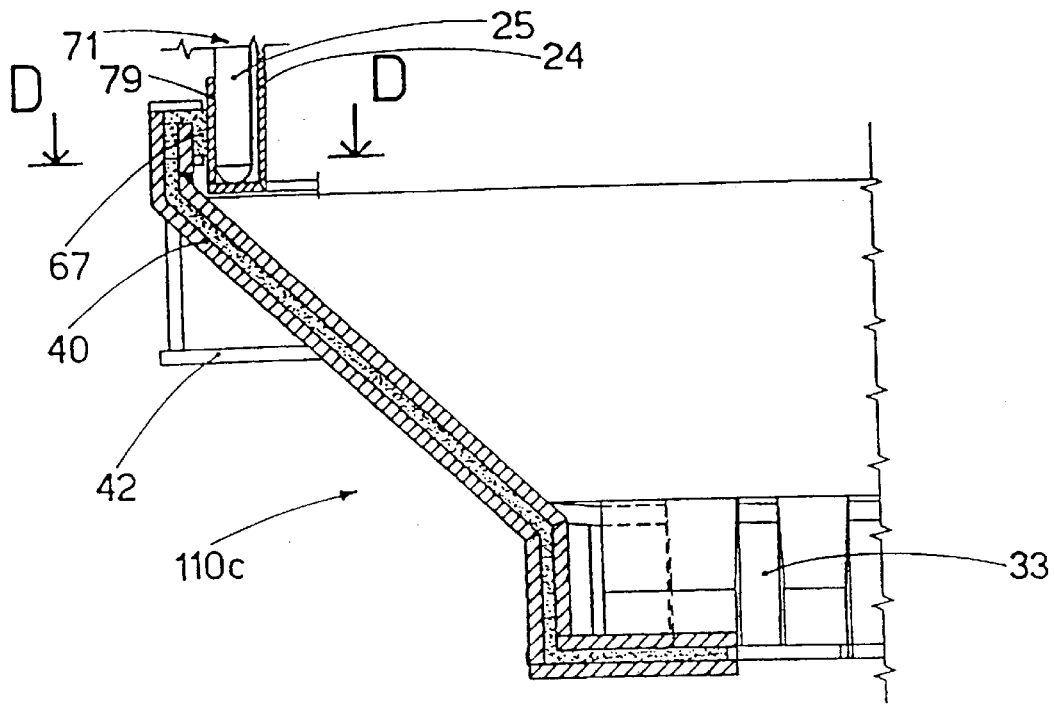
Figure 16:
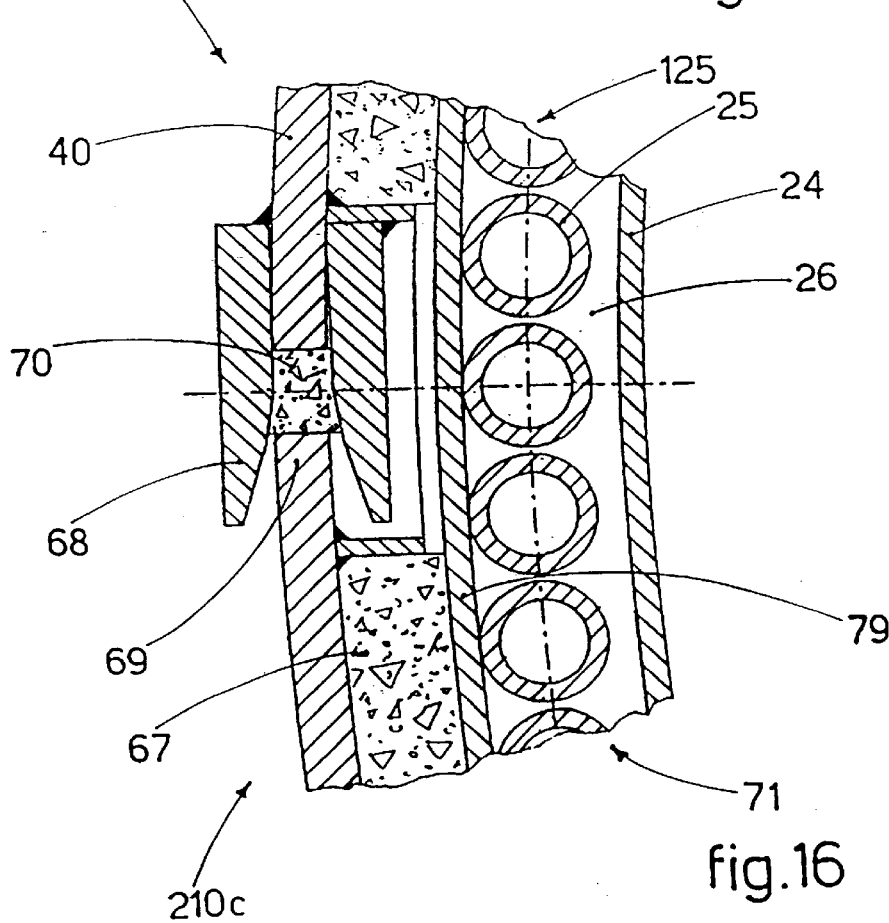

FIGS. 15 and 16 show in detail a variant of the sealing system between the movable portions 110c, 210c and the body of the basket 10 so that no air enters inside the basket 10 and/or no fumes come out during the pre-heating step.

Each portion 110c, 210c includes an outer wall 40 associated on the inside with a sealing layer 67 arranged adjacent to an abutment ring 79 arranged outside the lower part of the outer wall 71 of the body of the basket 10.

In correspondence with the area of reciprocal connection in the closed position, a movable portion 110c includes flared receptacle means 68 and the other movable portion 210c includes at the front part a male insertion segment 69 equipped with forward sealing means 70.

In this case, on the upper part of at least one tooth 33 there are temperature monitoring means 41, for example of the thermocouple type.

In this case, in cooperation with the lower part 10b of the cooled basket 10 there are lateral extensions 42 which serve to position the basket 10 correctly on the movable trolley 12 and automatically achieve the desired electric, hydraulic and oxygen connections.

Figure 12:
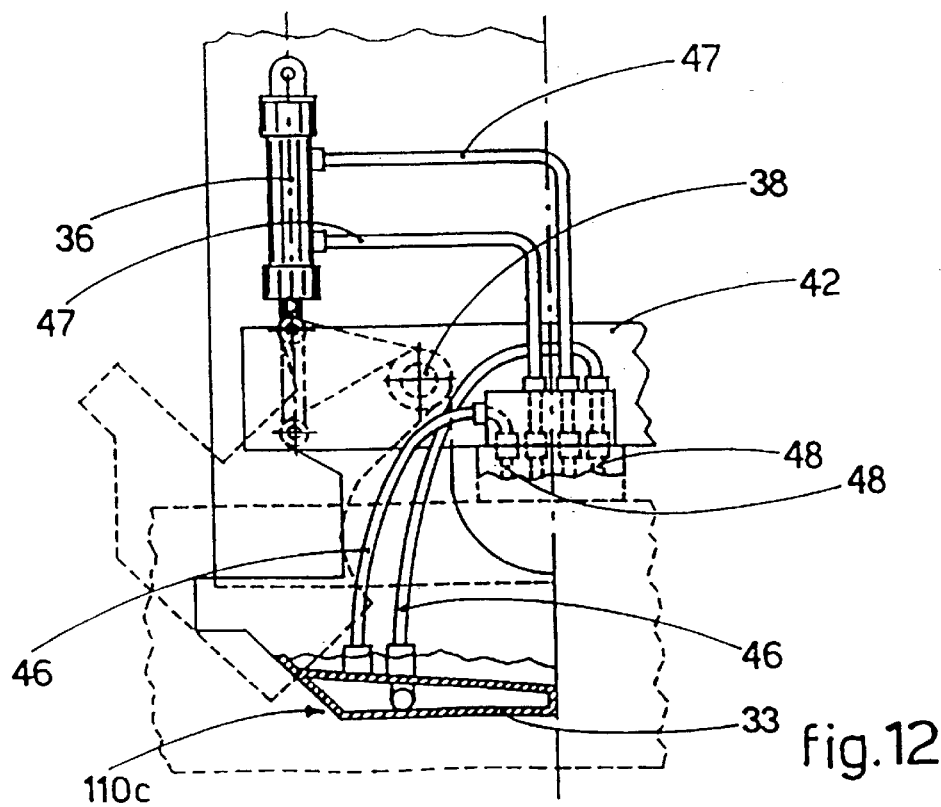

At least the fluid connections of the cooling lines 46 and the feeding connections 47 of the oil-dynamic actuators 36 converge into the lateral extensions 42 (FIG. 12).

There are centering holes 43 on the lateral extensions 42 which cooperate with mating pins 45 on the movable trolley 12.

The positioning of the cooled basket 10 on the movable trolley 12 causes the automatic rapid coupling of the fluid connections 46 and 47 to the relative feed connections 48 connected to the respective sources of fluid.

In this case, on the frame of the movable trolley 12 there is an intake ring 49 which, during the unloading of the scrap into the furnace 11, allows the fumes to be drawn in towards a discharge pipe 50 which is connected to the purification and discharge plant.

The intake ring 49 cooperates with hood elements 51, at least partially surrounding the intake ring 49, and solidly associated therewith in correspondence with the connection hinge 52.

The hood elements 51, at least during the unloading of the scrap into the furnace, close on the walls of the cooled basket 10, defining substantially an intake chamber 60 which is closed to the outer environment. The hermetic seal of the intake chamber 60 is ensured by the presence of sealing elements 53 which cooperate with the walls of the cooled basket 10 at least in the closed position of the hood elements 51.

The inclusion of the hood elements 51, together with the intake of the fumes achieved by the intake ring 49, prevents the fumes from escaping into the outer environment and minimises the heat loss from inside the furnace 11.

Figure 11:
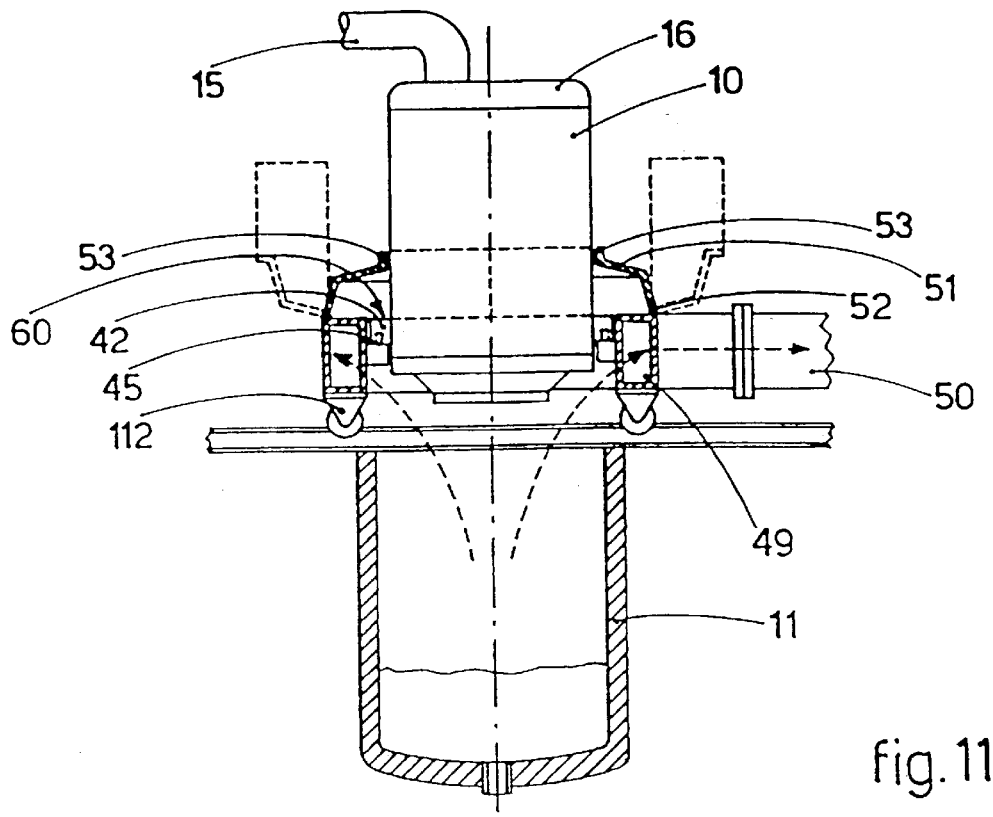

The hood elements 51 can be rotated around the connection hinge 52 by actuators which are not shown here, so as to assume an open position, as indicated by a line of dashes in FIG. 11.

The open position is taken by the hood elements 51 at least when the loaded cooled basket 10 is installed and when the empty cooled basket 10 is removed by the relative movable trolley 12 to move the basket 10.

Figure 14:
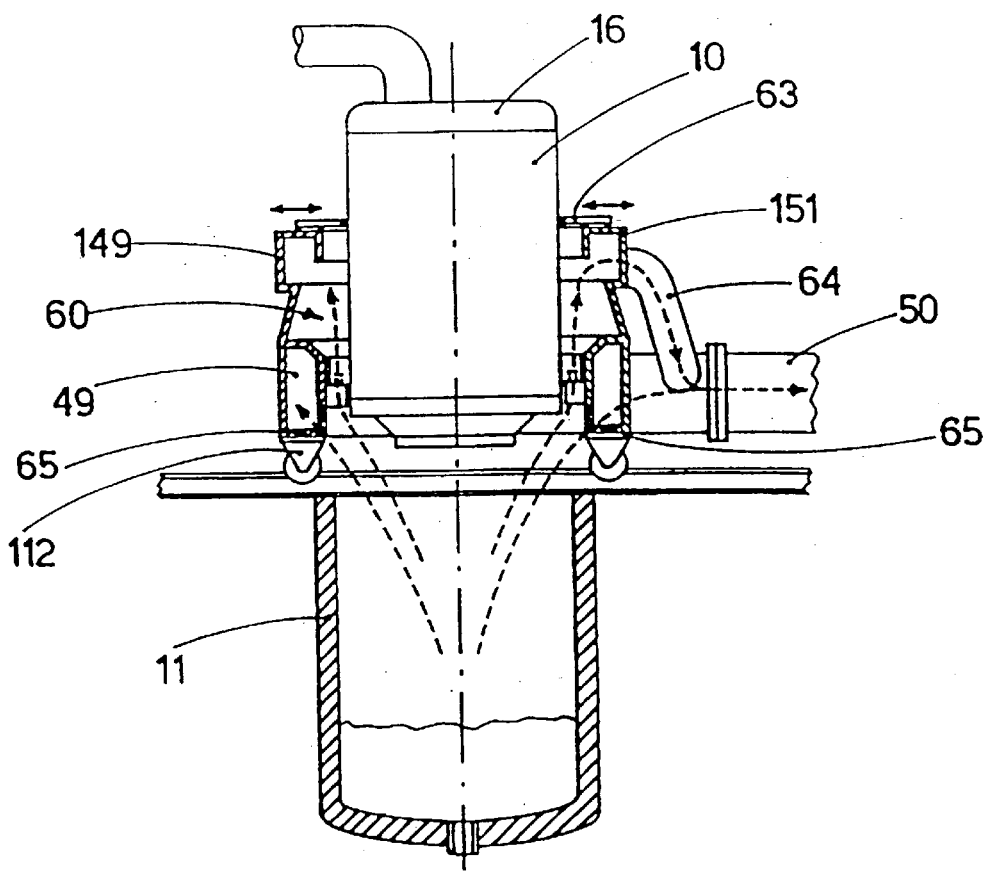

According to the variant shown in FIG. 14, the hood elements 151 are stationary and include a first intake conduit 49 arranged just above the mouth of the furnace 11 and a second intake conduit 149 connected to a duct 64 which is connected to the main discharge pipe 50.

The lines of dashes indicate the channelling of the fumes and gases from the mouth of the furnace 11 into the intake conduits 49, 149 and from here to the discharge ducts 64 and 50.

This configuration, which gives larger intake conduits 49, 149, ensures an extremely high intake efficiency, which can even make it possible to eliminate the secondary intake on the roof of the shed, and thus achieve very high savings.

According to the embodiment shown in FIG. 14, the intake conduit 49 includes holes 65 on the lower side which allow the fumes and gases, which tend to spread below the movable trolley 12, to be introduced and channelled.

Above the second intake conduit 149 there is a movable sealed closing system 63 which causes the formation of a closed intake chamber 60 on the circumference of the basket 10. The movable sealed closing system 63 can be taken to an open position, for example, to move the basket 10 from the movable trolley 12.

Figure 9:
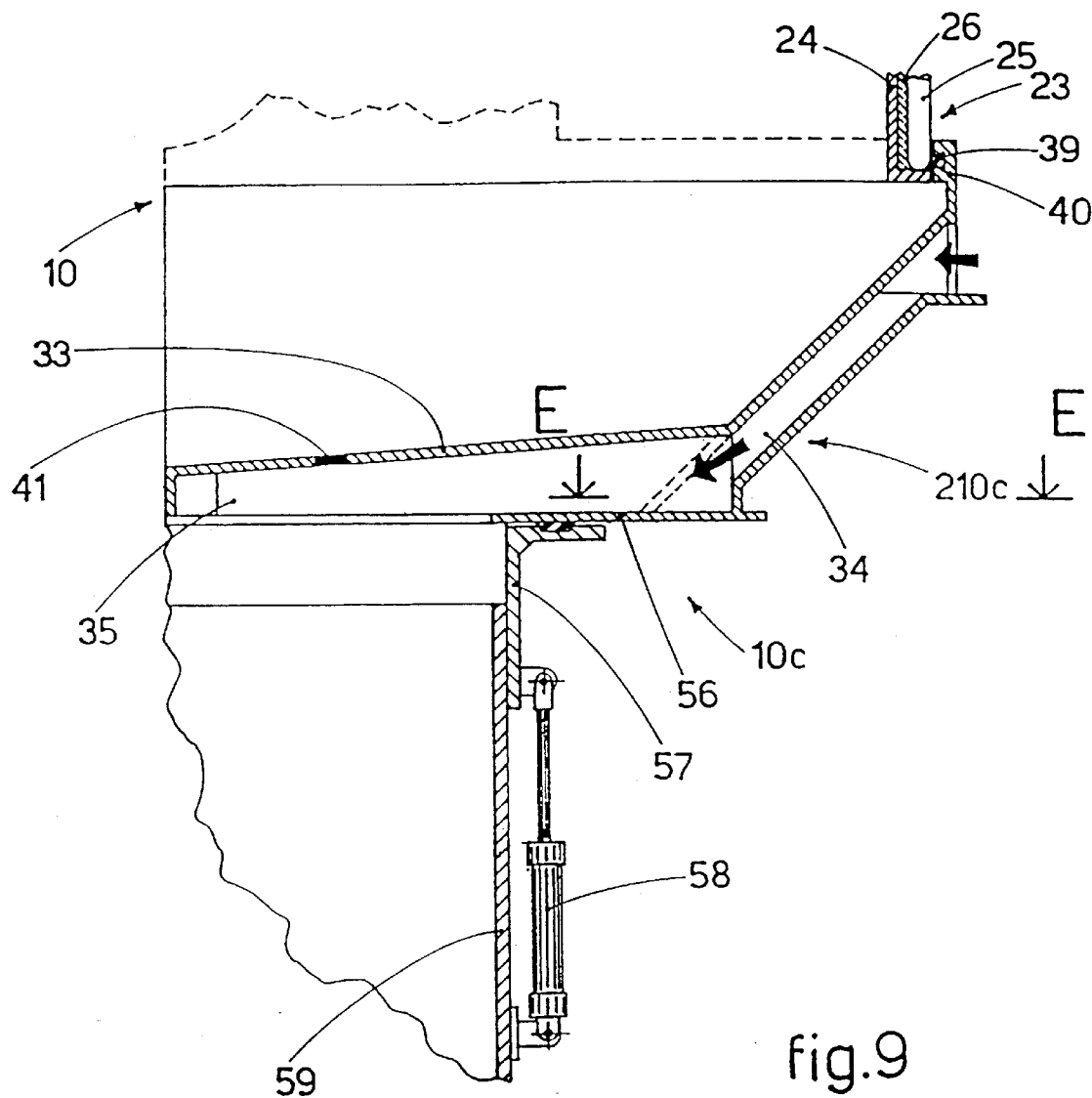

FIG. 13 shows a possible variant of FIG. 1 according to the embodiment of FIG. 9.

In this embodiment, the pre-heating fumes are discharged from the bottom of the basket 10 and sent to a collection and sedimentation chamber 62 located below the basket 10, from which they are then discharged by means of the pipe 118.

The movable trolley 12 includes, in this case, two components 112 and 212: component 112 of the movable trolley 12 serves to position and move the cooled basket 10 while component 212 serves to position and move the roof 13 of the furnace 11. Normally, the two components 112 and 212 are connected, mechanically or electrically, but during maintenance or for special operations they can operate separately.

What is claimed is:

1. Cooled basket for steel plants used in operations of loading and unloading scrap within an arc furnace and for the pre-heating of scrap by means of the fumes coming from a fourth hole of the furnace, the basket including a containing body substantially cylindrical in shape, said containing body comprising a sidewall, a cooled bottom equipped with toothed lower closing means which are temporally opened and lateral extensions to move and position the basket, the basket being characterized in that the containing body comprises a first upper part, a second cooled lower part and an openable cooled bottom, the second cooled lower part including an inner wall and an outer wall, said outer wall comprising adjacent first pipes through which cooling fluid flows, said second cooled lower part defining an internal volume substantially mating with the volume of a quantity of scrap to be unloaded into said arc furnace for each unloading operation, the first upper part including a wall comprising adjacent second pipes through which cooling fluid flows, said first upper part acting as a buffer store to temporally increase the capacity of the basket, and said adjacent first pipes being differentiated and autonomous with respect to said adjacent second pipes.

2. Basket as in claim 1, characterized in that includes a covering system with a cooling circuit wherein fluid circulates.

3. Basket as in claim 1, characterized in that the toothed lower closing means (10c) of the cooled bottom (10c) are associated with their own autonomous cooling means.

4. Basket as in claim 3, characterized in that said toothed lower closing means comprises a plurality of teeth and in that each tooth is defined by a box structure inside which a cooling fluid is made to flow.

5. Basket as in claim 1, characterized in that interspaces between the inner wall and the adjacent first pipes of the outer wall of the second lower part include filling material.

6. Basket as in claim 1, characterized in that adjacent first the pipes are arranged vertical.

7. Basket as in claim 1, characterized in that the adjacent first pipes are arranged horizontal.

8. Basket as in claim 1, characterized in that the inner wall is made of sheet metal.

9. Basket as in claim 1, characterized in that the inner wall comprises a layer of refractory material.

10. Basket as in claim 1, characterized in that the inner wall comprises an inner bundle of pipes in which cooling fluid circulates, the inner bundle of pipes having an interaxis greater than that adjacent of the first pipes of the outer wall and being distanced therefrom.

11. Basket as in claim 10, characterized in that at least one of the inner bundle of pipes of the inner wall and the adjacent first pipes of the outer wall are lined on the front part with a layer of refractory material.

12. Basket as in claim 10, characterized in that the inner bundle of pipes of the inner wall are fed independently of the adjacent first pipes of the outer wall.

13. Basket as in claim 10, characterized in that at least the inner bundle of pipes of the inner wall include anchorage means to anchor particles and powder deriving from the preheating of the scrap by means of the fumes.

14. Basket as in claim 1, characterized in that the second adjacent pipes of the wall of the first upper part are arranged vertical.

15. Basket as in claim 1, characterized in that the second adjacent pipes of the wall of the first upper part are arranged horizontal.

16. Basket as in claim 10, characterized in that at least one of the adjacent pipes of the first upper part and the pipes of the second lower part are of the type without joints or welds.

17. Basket as in claim 10, characterized in that at least one of the adjacent pipes of the first upper part and the pipes of the second lower part are not circular in section.

18. Basket as in claim 10, characterized in that at least one of the adjacent pipes of the first upper part and the walls of the second lower part are configured as replaceable panels.

19. Basket as in claim 18, characterized in that the replaceable panels cooperate with connection and sliding means and/or with thermal expansion joints.

20. Basket as in claim 1, characterized in that in cooperation with the first upper part there is at least a conduit to deliver oxygen.

21. Basket as in claim 1, characterized in that in cooperation with the first upper part there are post-combustion burners.

22. Basket as in claim 1, characterized in that it includes in the first upper part a support and connection base cooperating temporally with a covering system when the covering system is in the closed position.

23. Basket as in claim 1, characterized in that it includes in the second lower part lateral extensions including centering means and rapid connections to fluid connections associated with a movable trolley.

24. Basket as in claim 23, characterized in that cooperates with intake ring means and with hood elements on the movable trolley at least during the unloading of the scrap into the furnace.

25. Basket as in claim 23, characterized in that, when it is associated with the movable trolley, has a first position to pre-heat the scrap with a covering system in a closed position and with a roof of the furnace in a working position, and a second position to unload the scrap with the roof of the furnace removed, the basket aligned with the furnace, hood elements constituting a closed intake chamber above a mouth of the furnace and a first intake ring connected with a fume-intake system.

26. Basket as in claim 24, characterized in that the hood elements are movable from a first closed position around the cooled basket to a second open position.

27. Basket as in claim 25, characterized in that the hood elements are stationary, cooperate with sealing elements which are temporally closed on the cooled basket and define a second intake ring above the intake ring.

28. Basket as in claim 1, characterized in that is flared towards its bottom.

* * * * *